United States Patent
Peng et al.

(10) Patent No.: US 10,803,359 B2
(45) Date of Patent: Oct. 13, 2020

(54) IMAGE RECOGNITION METHOD, APPARATUS, SERVER, AND STORAGE MEDIUM

(71) Applicant: TENCENT TECHNOLOGY (SHENZHEN) COMPANY LIMITED, Shenzhen (CN)

(72) Inventors: Pai Peng, Shenzhen (CN); Xiaowei Guo, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 70 days.

(21) Appl. No.: 16/355,117

(22) Filed: Mar. 15, 2019

(65) Prior Publication Data
US 2019/0213448 A1 Jul. 11, 2019

Related U.S. Application Data (63) Continuation of application No. PCT/CN2017/107469, filed on Oct. 24, 2017.

(30) Foreign Application Priority Data

Dec. 30, 2016 (CN) .......................... 2016 1 1256335

(51) Int. Cl.
*G06K 9/62* (2006.01)
*G06K 9/00* (2006.01)
(Continued)

(52) U.S. Cl.
CPC ........... *G06K 9/6262* (2013.01); *G06F 16/51* (2019.01); *G06K 9/00624* (2013.01); *G06K 9/6256* (2013.01); *G06N 3/02* (2013.01)

(58) Field of Classification Search
CPC .............. G06K 9/6262; G06K 9/00624; G06K 9/6256; G06K 9/6212; G06N 3/02; G06N 3/08; G06F 16/41; G06F 16/75
(Continued)

(56) References Cited

U.S. PATENT DOCUMENTS 7,831,531 B1 * 11/2010 Baluja ...................... G06N 3/08
706/25
10,248,663 B1 * 4/2019 Keisler ................ G06N 3/0454
(Continued)

FOREIGN PATENT DOCUMENTS

| CN | 102646200 | 8/2012 |
| CN | 104346440 | 2/2015 |

(Continued)

OTHER PUBLICATIONS

Zhenting Gong et al. "An image retrieval method based on convolutional neural network and hash coding", <CAAI Transactions on Intelligent Systems> Published on Jun. 30, 2016, vol. 11, Issue No. 3, pp. 391-398.

(Continued)

*Primary Examiner* — Ali Bayat
(74) *Attorney, Agent, or Firm* — Oblon, McClelland, Maier & Neustadt, L.L.P.

(57) ABSTRACT

In some examples, processing circuitry obtains a shallow hash neural network (SHNN) model that has been trained from a HNN model and based on a set of SHNN training images that aggregates image recognition results from at least two reference hash neural network (HNN) models. Further, the processing circuitry performs an image recognition on the image according to the SHNN model, to obtain an image class vector in an image class space. The image class vector includes probability values of respective image classes in the image class space. A probability value of an (Continued)

image class in the image class space is a combination of intermediate probability values of the image class that are resulted from the at least two reference HNN models. Further, the processing circuitry determines one of the image classes for the image according to the probability values of the respective image classes in the image class space.

20 Claims, 4 Drawing Sheets (51) Int. Cl.
  *G06F 16/51* (2019.01)
  *G06N 3/02* (2006.01)
(58) Field of Classification Search
  USPC .......................................................... 382/103
  See application file for complete search history.

(56) References Cited

U.S. PATENT DOCUMENTS

| | | | | |
|---|---|---|---|---|
| 2007/0217676 | A1* | 9/2007 | Grauman | G06K 9/6212 382/170 |
| 2015/0161147 | A1* | 6/2015 | Zhao | G06F 16/41 707/772 |
| 2015/0286885 | A1* | 10/2015 | Bulan | G06K 9/4642 382/104 |
| 2016/0358043 | A1 | 12/2016 | Mu et al. | |
| 2017/0330054 | A1 | 11/2017 | Fu et al. | |
| 2018/0173992 | A1* | 6/2018 | Zink | G06T 7/246 |
| 2019/0073593 | A1* | 3/2019 | Luo | G06Q 10/10 |

FOREIGN PATENT DOCUMENTS

| | | |
|---|---|---|
| CN | 104463241 | 3/2015 |
| CN | 104834748 | 8/2015 |
| CN | 106021364 | 10/2016 |
| CN | 106250921 | 12/2016 |
| CN | 107067020 | 8/2017 |

OTHER PUBLICATIONS

Office Action dated Jun. 19, 2019 in Chinese Patent Application No. 201611256335.5 (With Concise English Translation), p. 1-8.
International Preliminary Report on Patentability dated Jul. 2, 2019 in PCT/CN2017/107469 filed Oct. 24, 2017. p. 1-5.
English Translation of Written Opinion of the International Searching Authority dated Jan. 18, 2018 in PCT/CN2017/107469 filed Oct. 24, 2017. p. 1-5.
International Search Report dated Jan. 18, 2018 in PCT/CN2017/107469 filed Oct. 24, 2017. (With English Translation).
Written Opinion dated Jan. 18, 2018 in PCT/CN2017/107469 filed Oct. 24, 2017.

* cited by examiner

IMAGE RECOGNITION METHOD, APPARATUS, SERVER, AND STORAGE MEDIUM

RELATED APPLICATION

This application is a continuation of International Application No. PCT/CN2017/107469, filed on Oct. 24, 2017, which claims priority to Chinese Patent Application No. 201611256335.5, filed with the Chinese Patent Office on Dec. 30, 2016 and entitled "IMAGE RECOGNITION METHOD AND APPARATUS". The entire disclosures of the prior applications are hereby incorporated by reference in their entirety.

FIELD OF THE TECHNOLOGY

Embodiments of the present disclosure relate to the field of image recognition technologies, and in particular, to an image recognition method, an apparatus, a server, and a storage medium.

BACKGROUND OF THE DISCLOSURE

As Internet technologies develop and search engines increasingly improve, users are not satisfied with single text retrieval manner, but perform retrieval based on images more often. This requires the search engines to have an image recognition function, to retrieve a similar image similar to an input image.

Currently, the search engines mainly trains a convolutional neural network (CNN) model and performs recognition on an image based on a trained CNN model. A specific process is as follows: obtaining a to-be-recognized image and at least two trained CNN models; extracting a feature vector of the to-be-recognized image according to each trained CNN model, and processing the extracted feature vector to obtain at least two reference class probability vectors, each reference class probability vector corresponding to a CNN model and including a reference class probability that the to-be-recognized image belongs to each class, and an element on each dimension of each reference class probability vector representing a reference class probability; calculating an average value of elements on a same dimension of the at least two reference class probability vectors, to obtain a class probability of each class; forming a class probability vector by using class probabilities of all classes; and determining a class of the to-be-recognized image according to the class probability vector.

The entire recognition process consumes relatively long time due to a need to perform recognition on the to-be-recognized image according to the at least two trained CNN models and a need to perform aggregation on elements on each dimension of the at least two reference class probability vectors.

SUMMARY

Aspects of the disclosure provide methods and devices for image recognition. In some embodiments, a server device for image recognition includes interface circuitry and processing circuitry. The interface circuitry receives an image to be recognized, and the processing circuitry performs image recognition. In some examples, the processing circuitry obtains a shallow hash neural network (SHNN) model (also referred to as trained SHNN model) that has been trained from a hash neural network (HNN) model and based on a set of SHNN training images that aggregates image recognition results from at least two reference hash neural network (HNN) models. Further, the processing circuitry performs an image recognition on the image according to the SHNN model, to obtain an image class vector in an image class space. The image class vector includes probability values of respective image classes in the image class space. A probability value of an image class in the image class space is a combination of intermediate probability values of the image class that are resulted from the at least two reference HNN models due to the SHNN model being trained based on the aggregation of image recognition results from the at least two reference HNN models. Further, the processing circuitry determines one of the image classes for the image according to the probability values of the respective image classes in the image class space.

In some embodiments, the processing circuitry obtains at least two training images that are respectively marked with an initial image class. Then, in some examples, the processing circuitry trains at least two HNN models according to the at least two training images, to obtain the at least two reference HNN models, and aggregates the at least two reference FINN models, to obtain the SHNN model. In an example, the processing circuitry obtains at least two modeling images. Then, for each modeling image of the at least two modeling images, the processing circuitry performs recognition on the modeling image respectively according to the at least two reference HNN models, to obtain at least two intermediate image class vectors of the modeling image. Further, the processing circuitry calculates average probability values by the image classes from the at least two intermediate image class vectors. In some examples, the processing circuitry determines an aggregation image class of the modeling image according to the average probability values by the image classes of the modeling image to convert the modeling image to an SHNN training image with the aggregation image class. Then, the processing circuitry trains the HNN model according to the at least two SHNN training images, to obtain the SHNN model.

In some embodiments, the processing circuitry extracts a feature vector of the image according to the SHNN model, and maps the extracted feature vector to a binary hash code for the image, the binary hash code having a string of binary values. Further, in some examples, the processing circuitry calculates a hamming distance between the binary hash code of the image, and a reference binary hash code of a reference image that is stored in an image database. Then, the processing circuitry determines, when the hamming distance between the binary hash code of the image and the reference binary hash code of the reference image is less than a first preset value, that the image is a similar image to the reference image.

In some embodiments, the processing circuitry is configured to convert respective elements on dimensions in the feature vector to respective S-type values. Then, the processing circuitry respectively converts the S-type values to binary values corresponding to the elements based on a second preset value and then forms, a character string using the binary values according to a sequence of the corresponding elements in the feature vector.

According to an aspect of the disclosure, when the image has a field of view (FOV) label, the processing circuitry determines a target landmark according to the FOV label, calculates a capture probability of the target landmark, and updates the image class vector of the image according to the capture probability of the target landmark.

In some embodiments, the FOV label includes a photographing position, a photographing orientation, a visual angle, and a largest visual distance, and the processing circuitry determines at least two candidate landmarks according to the photographing position and selects the target landmark from the at least two candidate landmarks according to the photographing orientation, the visual angle, and the largest visual distance.

In some examples, the processing circuitry calculates an average value of the capture probability for the target landmark and a probability value for an image class that corresponds to the target landmark, and updates the image class vector of the image according to the average value.

Aspects of the disclosure also provide a non-transitory computer-readable medium storing instructions which when executed by a computer cause the computer to perform any of the methods for image recognition, as described above.

BRIEF DESCRIPTION OF THE DRAWINGS

To describe the technical solutions of the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings.

DESCRIPTION OF EMBODIMENTS

To make the objectives, technical solutions, and advantages of the present disclosure clearer, the following further describes implementations of the present disclosure in detail with reference to the accompanying drawings.

As the image recognition technologies develop, an image recognition manner based on a CNN model is widely applied to various fields of social life. For example, in a field such as national security, military security, or public security, there are typical application scenarios such as intelligent door control, intelligent video surveillance, public security surveillance, customs identification authentication, and driver license verification; in civil and economy fields, there is a typical application scenario such as identification verification of card holders of various types of bank cards, debit cards, and credit cards; in a search field, there is a typical application scenario such as image retrieval; and in a home entertainment filed, there is a typical application scenario such as identifying owner identification by an intelligent toy or a domestic robot.

Currently, when image recognition is performed, recognition time is relatively long due to a need to perform aggregation on at least two reference class probability vectors. In addition, when a similar image is retrieved, a similarity between a feature vector and a feature vector of each image stored in an image database needs to be calculated, however, a dimension of an extracted feature vector is relatively high and is usually 4096-dimension, resulting in a large calculation amount in the retrieval process and long retrieval time.

To resolve the problem in the related technologies, an embodiment of the present disclosure provides an image recognition method. According to the method, at least two trained HNN models are aggregated to obtain a trained SHNN model, and image recognition is performed based on the trained SHNN model, thereby greatly shortening time of image recognition while ensuring recognition accuracy.

Figure 1A:
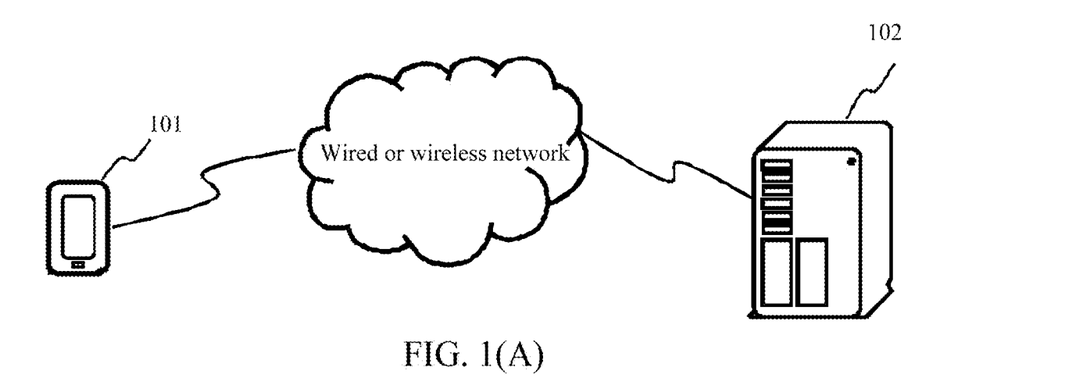
FIG. 1(A) shows an implementation environment of an image recognition method according to an embodiment of the present disclosure.

FIG. 1(A) shows an implementation environment of an image recognition method according to an embodiment of the present disclosure. The implementation environment includes a terminal 101 and a server 102.

The terminal 101 has an image acquisition function, and may be a smartphone, a tablet computer, or the like. An information retrieval application is installed in the terminal 101, and the terminal 101 may obtain a similar image of a to-be-recognized image by sending the to-be-recognized image to the server 102.

The server 102 serves a background of the information retrieval application, and the server 102 may provide service for the terminal 101 through the information retrieval application.

The terminal 101 may communicate with the server 102 by using a wired network or a wireless network.

Figure 1B:
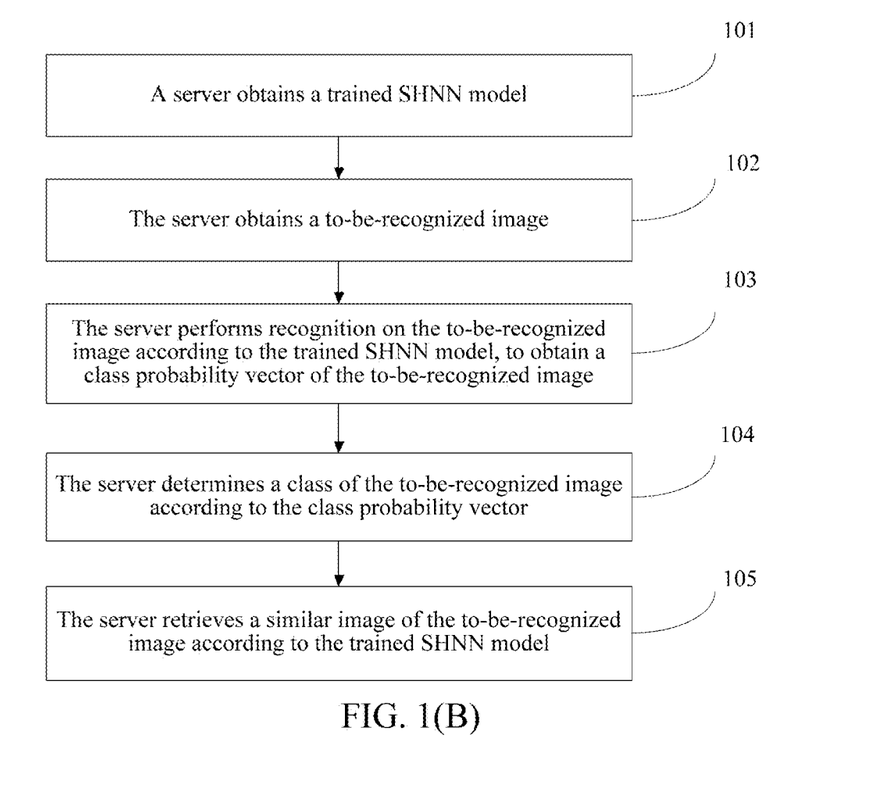
FIG. 1(B) is a flowchart of an image recognition method according to an embodiment of the present disclosure.

An embodiment of the present disclosure provides an image recognition method. An example in which a sever performs the method is used, and referring to FIG. 1(B), a procedure of the method provided in this embodiment of the present disclosure includes the following steps:

101: A server obtains a trained SHNN model.

The SHNN model includes at least two convolution layers, at least one fully-connected layer, a hash layer, and an output layer. The hash layer is disposed between the fully-connected layer and the output layer, and is used to convert an extracted feature vector to a binary hash code. The SHNN model is a neural network having a model compression function, is obtained by aggregating at least two HNN models, and may simulate a result of aggregating the at least two HNN models. Performing recognition on an image by using the SHNN model can greatly reduce time of image recognition while ensuring recognition accuracy.

In this embodiment of the present disclosure, refer to the following steps 1011 to 1013 for a process in which the server trains the SHNN model.

1011: The server obtains at least two training images.

The training images are images used for model training, the training images are marked with initial classes, and the initial classes of the training images are related to recognition classes of a to-be-trained HNN model. For example, when the to-be-trained HNN model is a model that can recognize different languages, the training images may be images including characters and character strings of different languages; and when the to-be-trained HNN model is a model that can recognize colors, the training images may be images including different colors.

There may be 1,000, 2,000, or 3,000 training images obtained by the server. A quantity of images obtained by the server is not specifically limited in this embodiment of the present disclosure. A manner in which the server obtains the training images includes but is not limited to: collecting at least two images by using the Internet, marking each collected image with an initial class in a manner of manual marking, and using the images marked with initial classes as the training images.

1012: The server trains at least two to-be-trained HNN models according to the at least two training images, to obtain at least two trained HNN models.

An example of training any to-be-trained HNN model is used. Refer to the following steps 10121 to 10128 for a process in which the server trains the to-be-trained HNN model.

10121: The server obtains an initial model parameter of the to-be-trained HNN model, the initial model parameter including an initial convolution kernel of each convolution layer, an initial bias matrix of each convolution layer, an initial weight matrix of each fully-connected layer, and an initial bias vector of each fully-connected layer.

Specifically, the process of training a HNN model (also referred to as a to be-trained HNN model) is a process of determining model parameters of the INN model. When the model parameter is determined, first, an initial model parameter may be initialized for the to-be-trained HNN model. In a subsequent training process, the initial model parameter is continuously optimized, and a best model parameter obtained through optimization is used as a model parameter of a trained HNN model.

The to-be-trained HNN model generally includes at least two convolution layers, at least one fully-connected layer, a hash layer, and an output layer. Each convolution layer includes at least two convolution kernels and at least two bias matrices, and each fully-connected layer includes at least two weight matrices and at least two bias vectors. Therefore, the obtained model parameter includes the initial convolution kernel of each convolution layer, a hash algorithm, the initial bias matrix of each convolution layer, the initial weight matrix of the fully-connected layer, and the initial bias vector of the fully-connected layer. A quantity of convolution layers and a quantity of the fully-connected layers included in the to-be-trained HNN model may be set according to a requirement. A quantity of convolution kernels and a quantity of bias matrices included in each convolution layer, and a quantity of weight matrices and a quantity of bias vectors included in each fully-connected layer are not specifically limited in this embodiment of the present disclosure. A specific hash algorithm is also limited in this embodiment of the present disclosure, as long as a feature vector can be converted to a binary hash code. In addition, for a dimension of each convolution kernel and a dimension of each bias matrix, and a dimension of each weight matrix and a dimension of each bias vector, an empirical value may be used. For example, a first convolution layer may include 96 convolution kernel $C^1$ of size 5×5, where $C^1=\{C_i^1\}_{i=1}^{96}$, and 96 bias matrices $B^1$ of size 5×5, where $B^1=\{B_i^1\}_{i=1}^{96}$.

With reference to the foregoing description, when the initial model parameter of the to-be-trained HNN model is obtained, a value may be randomly selected from a specific numeric range as a value of each element in the initial model parameter. For example, for each element in each initial convolution kernel, initial weight matrix, initial bias matrix, and initial bias vector, a random number may be selected from an interval [−r, r]. Herein, r is a threshold of the initial model parameter, and may be an empirical value. For example, r may be 0.001.

10122: The sever respectively performs, on each convolution layer, a convolution operation and a maximum pooling operation on each training image by using the initial convolution kernel and initial bias matrix in each convolution layer, to obtain a feature vector of each training image in each convolution layer.

Features of different layers of the image may be extracted from the shallower to the deeper by means of the convolution operation and the maximum pooling operation. Therefore, when the to-be-trained HNN model is trained, to obtain the feature vector of the training image, on each convolution layer, the convolution operation and the maximum pooling operation may be performed on the training image.

The respectively performing a convolution operation and a maximum pooling operation on each training image by using the initial convolution kernel and initial bias matrix in each convolution layer, to obtain a feature vector of each training image in each convolution layer may be implemented by using, but not limited to, the following steps 101221 to 101223.

101221. For any training image, a feature vector in a previous convolution layer is input to a current convolution layer, the convolution operation is performed on the feature vector in the previous convolution layer by using an initial convolution kernel and an initial bias matrix in the current convolution layer, to obtain a convolution image in the current convolution layer.

101222. The maximum pooling operation is performed on the convolution image in the current convolution layer, to obtain a feature vector of the training image in the current convolution layer, and the feature vector in the current convolution layer continues to be transmitted to a next convolution layer.

101223. On the next convolution layer, the convolution operation and the maximum pooling operation are performed on the feature vector in the current convolution layer, until the convolution operation and the maximum pooling operation are performed on a last convolution layer and a feature vector in the last convolution layer is obtained.

A principle of performing the convolution operation and the maximum pooling operation on each convolution layer is the same as the principle in steps 101221 to 101223. Refer to description in steps 101221 to 101223 for details, and details are not described herein again.

10123. The server processes each feature vector on each fully-connected layer by using each initial weight matrix and initial bias vector, to obtain a reference class probability vector of each training image.

A feature vector of a training image may be input into the fully-connected layer, the feature vector is multiplied by a weight matrix of the fully-connected layer, and a bias vector of the fully-connected layer is added to the product, to obtain the reference class probability vector of each training image.

The reference class probability vector is a one-dimensional vector, the reference class probability vector includes a reference class probability that the training image belongs to each class, and a quantity of elements in the reference class probability vector is related to a quantity of classes that can be recognized by the to-be-trained HNN model. For example, if the to-be-trained HNN model can recognize ten classes of images, the reference class probability vector includes ten elements, and each element represents the reference class probability that the training image belongs to a certain class.

10124. The server calculates a class error according to the reference class probability vector of each training image and the initial class of each training image.

The calculating a class error according to the reference class probability vector of each training image and the initial class of each training image may be implemented by using, but not limited to, the following steps 101241 to 101243.

101241. The server obtains the initial class of each training image.

101242. The server calculates a class error of each training image according to the reference class probability vector of each training image and the initial class of each training image.

101243. Calculate a class error average value of all training images, and use the class error average value as the class error.

10125. The server converts the feature vector of each training image to a binary hash code, and calculates an average value of the binary hash codes, to obtain an average binary hash code.

For a specific implementation of the process, refer to subsequent processes.

10126. The server adjusts the model parameter of the to-be-trained HNN model based on the class error and a value of the average binary hash code.

The adjusting the model parameter of the to-be-trained FINN model by the server includes, but is not limited to, optimizing a hash algorithm according to the value of the average binary hash code, and back-propagating the class error to the to-be-trained HNN model by using a stochastic gradient descent (SGD) algorithm, so as to update the model parameter of the to-be-trained HNN model.

10127. The server continues to adjust the model parameter according to an adjusted model parameter and at least two training images, until a quantity of iteration times reaches a preset quantity of times.

The preset quantity of times may be an empirical value. To enable a trained FINN model to be more accurate, a relatively large value may be selected as a value of the preset quantity of times, for example, 10,000.

10128. The server uses an HNN model corresponding to a model parameter obtained when the quantity of iteration times reaches the preset quantity of times as a trained HNN model.

For example, if the preset quantity of times is 10,000, a model parameter obtained when the quantity of iteration times reaches 10,000 is used as a model parameter of the trained HNN model, and an obtained HNN model at this moment is the trained HNN model.

A training process of one to-be-trained HNN model is used as an example in the above, and a training process of another to-be-trained HNN model is the same as the foregoing training process of the one to-be-trained HNN model. A difference lies in that an initial model parameter selected each time varies. Refer to the foregoing training process of the one to-be-trained HNN model for details, and details are not described herein again.

1013. The server aggregates the at least two trained HNN models, to obtain the trained SHNN model.

Refer to the following steps 10131 to 10135 for a process in which the server aggregates the at least two trained HNN models, to obtain the trained SHNN model.

10131. The server obtains a plurality of modeling images.

The modeling images are images used to construct the SHNN model, and a quantity of modeling images obtained by the server may be 2,000, 4,000, or 5,000. The quantity of modeling images obtained by the server is not limited in this embodiment of the present disclosure. A manner in which the server obtains the modeling images includes but is not limited to: collecting at least two images by using the Internet, and using the collected images as the modeling images.

10132. For any modeling image, the server performs recognition on the modeling image according to each trained HNN model, to obtain at least two reference class probability vectors of the modeling image.

For any modeling image, after inputting the modeling image to each trained HNN model, the server extracts a feature vector from the modeling image, and processes the extracted feature vector, to obtain the at least two reference class probability vectors.

10133. The server calculates an average value of elements on a same dimension of the at least two reference class probability vectors, to obtain a class probability vector of the modeling image.

For the obtained at least two reference class probability vectors, the server calculates the average value of the elements on a same dimension of the at least two reference class probability vectors, to obtain an average value of elements on each dimension, and forms the class probability vector of the modeling image by using the average value of elements on each dimension of the at least two reference class probability vectors.

For example, the trained HNN model is a model that can recognize different temples, and classes of the temples that can be recognized are a China temple, a Japan temple, a Thailand temple, and an India temple. For trained HNN models $N_1$, $N_2$, and $N_3$, reference class probabilities that the model $N_1$ recognizes a modeling image as a China temple, a Japan temple, a Thailand temple, and an India temple are respectively 0.85, 0.1, 0.05, and 0; reference class probabilities that the model $N_2$ recognizes a modeling image as a China temple, a Japan temple, a Thailand temple, and an India temple are respectively 0.75, 0.2, 0.05, and 0; and reference class probabilities that the model $N_3$ recognizes a modeling image as a China temple, a Japan temple, a Thailand temple, and an India temple are respectively 0.75, 0.2, 0.05, and 0. A class probability that the modeling image is a China temple is (0.85+0.35+0.75)/3=0.65, a class probability that the modeling image is a Japan temple is (0.1+0.4+0.2)/3=0.23, a class probability that the modeling image is a Thailand temple is (0.05+0.15+0.05)/3=0.09, and a class probability that the modeling image is an India temple is (0+0.1+0)/3=0.03. Average values of an element on each dimension of three reference class probability vectors form a class probability vector, and the class probability vector is (0.65, 0.23, 0.09, 0.03).

10134. The server determines an initial class of the modeling image according to the class probability vector corresponding to the modeling image.

Based on the class probability vector corresponding to the modeling image that is obtained in step 10133, the server uses a largest value in elements on dimensions of the class probability vector as the initial class of the modeling image. For example, the class probability vector of the modeling image that is obtained in the foregoing example is (0.65, 0.23, 0.09, 0.03). According to the class probability vector, a largest value in the elements of the class probability vector is 0.65. Therefore, it may be determined that the initial class of the modeling image is a China temple.

10135. The server trains any to-be-trained HNN model according to at least two modeling images to which initial classes are added, to obtain the trained SHNN model.

The server adds the obtained initial classes to the modeling images, and trains any to-be-trained HNN model by using the method in the foregoing steps 10121 to 10128, to obtain the trained SHNN model. The trained SHNN model is obtained by aggregating at least two trained HNN models, and therefore, a recognition result having same accuracy as the at least two trained HNN models may be obtained by means of performing recognition on an image by using the trained SHNN model. In addition, after the trained SHNN model is obtained, the server may delete the at least two trained HNN models, to reduce storage pressure of the server.

It should be noted that, the reference class probability vector includes the reference class probability that the image belongs to each class, and the reference class probability actually is a prediction value. In this embodiment of the present disclosure, the reference class probability vector is referred to as a point of interest (POI) prediction value.

An example of training the to-be-trained HNN model according to the initial class of each modeling image is used in the above. Actually, each trained HNN model has a hash layer, the hash layer may map the extracted feature vector to a binary hash code, and the binary hash code is a character string of 0 s or 1 s. Therefore, the training the to-be-trained HNN model according to the modeling image further includes training the to-be-trained FINN model according to binary hash codes of at least two modeling images, and a specific process is:

(1). For any modeling image, the server inputs the modeling image to each trained HNN model, to obtain at least two feature vectors.

(2) For any feature vector, the server converts an element on each dimension in the feature vector to an S-type value according to the trained FINN model corresponding to the feature vector, to obtain at least two S-type values, a quantity of the at least two S-type values being the same as a quantity of dimensions of the feature vector. The S-type value refers to Sigmoid-type value that is obtained through a Sigmoid function.

(3). The server compares the at least two S-type values with a second preset value; if any S-type value is greater than the second preset value, maps the S-type value to 1; and if any S-type value is less than the second preset value, maps the S-type value to 0. Then, the server forms, according to an element sequence on each dimension in the feature vector, a character string by using 0 or 1 to which the at least two S-type values are mapped, to obtain the binary hash code corresponding to the feature vector.

The second preset value may be set according to an empirical value, and the second preset value may be 0.5, 0.6, 0.7, or the like. A value of the second preset value is not specifically limited in this embodiment of the present disclosure.

(4) The server calculates an average value of the binary hash code corresponding to each trained FINN model, to obtain an average binary hash code.

The server calculates an average value of elements on a same dimension of the binary hash codes corresponding to at least two trained HNN models, compares an average value of elements on each dimension with the second preset value, when the average value of the elements on any dimension is greater than the second preset value, maps the elements on the dimension to 1, and when the average value of the elements on any dimension is less than the second preset value, maps the elements on the dimension to 0. Then the server forms the character string by using 0 or 1 to which the elements on each dimension are mapped, to obtain an average binary hash code.

It should be noted that, an example in which the binary hash code is the character string of 0 s or is 1 s used in the above. In an actual application, the binary hash code may be a character string of first numbers and second numbers, and the first number and the second number may be any two different numbers. Correspondingly, when any S-type value is greater than the second preset value, the S-type value may be mapped to the first number, and when any S-type value is less than the second preset value, the S-type value may be mapped to the second number; or when any S-type value is greater than the second preset value, the S-type value may be mapped to the second number, and when any S-type value is less than the second preset value, the S-type value may be mapped to the first number. For example, assuming that the second preset value is 0.5, for the trained HNN models $N_1$, $N_2$, and $N_3$, the model $N_1$ converts an element on each dimension of the extracted feature vector, and obtained S-type values are respectively 0.93, 0.3, 0.59, and 0.81; the model $N_2$ converts an element on each dimension of the extracted feature vector, and obtained S-type values are respectively 0.12, 0.83, 0.07, and 0.91; and the model $N_3$ converts an element on each dimension of the extracted feature vector, and obtained S-type values are respectively 0.89, 0.74, 0.28, and 0.9. The server compares the four S-type values corresponding to the model $N_1$ respectively with 0.5, and may find that a binary hash code corresponding to the model $N_1$ is 1011; compares the four S-type values corresponding to the model $N_2$ respectively with 0.5, and may find that a binary hash code corresponding to the model $N_2$ is 0101; and compares the four S-type values corresponding to the model $N_3$ respectively with 0.5, and may find that a binary hash code corresponding to the model $N_3$ is 1101. Then the sever calculates average values of elements on each dimension of the binary hash codes corresponding to the trained HNN models $N_1$, $N_2$, and $N_3$. An average value of elements on a first dimension is $(0.93+0.12+0.89)/3=0.64$, an average value of elements on a second dimension is $(0.3+0.83+0.74)/3=0.62$, an average value of elements on a third dimension is $(0.59+0.07+0.28)/3=0.31$, and an average value of elements on a fourth dimension is $(0.81+0.91+0.9)/3=0.87$. The server compares the average value of the elements on each dimension with the second preset value, and may find, through comparison, the average binary hash code is 1101.

The process in which the server aggregates the at least two trained HNN models, to obtain the trained SHNN mode is described in detail in the following by using FIG. 2 as an example.

Figure 2:
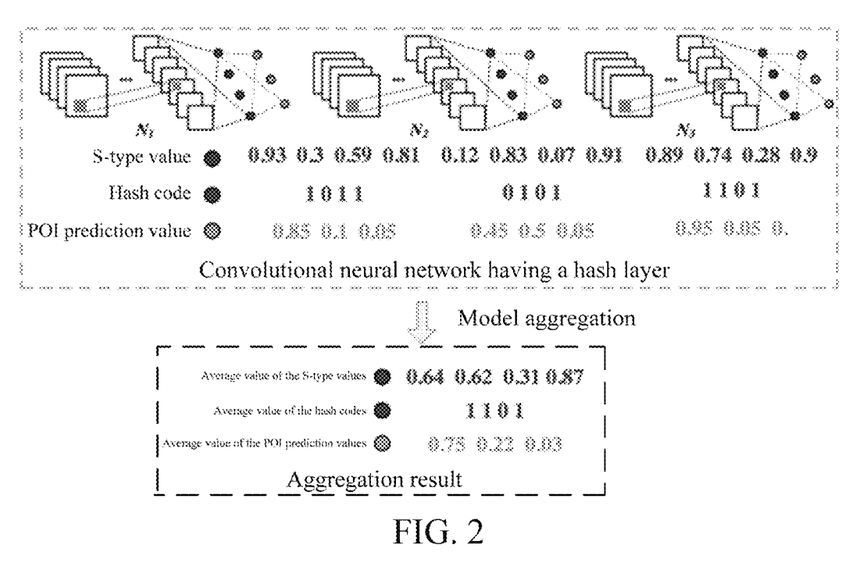
FIG. 2 is a schematic diagram of a model aggregation process according to an embodiment of the present disclosure.

Referring to FIG. 2, assuming that the second preset value is 0.5, for the trained HNN models $N_1$, $N_2$, and $N_3$, when any modeling image is input to the trained model $N_1$, it may be found that a reference class probability vector is (0.85, 0.1, 0.05), the extracted feature vector is converted to four S-type values, namely, 0.93, 0.3, 0.59, and 0.81, and the four S-type values of the feature vector may be mapped to the binary hash code 1011 by means of comparing the four S-type values with the second preset value 0.5; when the modeling image is input to the trained model $N_2$, it may be found that a reference class probability vector is (0.45, 0.5, 0.05), the extracted feature vector is converted to four S-type values, namely, 0.12, 0.83, 0.07, and 0.91, and the four S-type values of the feature vector may be mapped to the binary hash code 0101 by means of comparing the four S-type values with the second preset value 0.5; and when modeling image is input to the trained model $N_3$, it may be found that a reference class probability vector is (0.95, 0.05, 0), the extracted feature vector is converted to S-type values, namely, 089, 0.74, 0.28, and 0.9, and the four S-type values of the feature vector may be mapped to the binary hash code 1101 by means of comparing the four S-type values with the second preset value 0.5. The server may find that the class probability vector of the modeling image is (0.75, 0.22, 0.23) by means of calculating an average value of the reference class probability vectors of the three models, may find that an average S-type value is (0.64, 0.62, 0.31, 0.87) by means of calculating an average value of the four S-type values of the three models, and may find that an average binary hash code is (1101) by means of calculating an average value of the binary hash codes of the three models. A class probability vector and an average binary hash code of each modeling image may be obtained by means of processing each modeling image in the foregoing manner.

102. The server obtains a to-be-recognized image.

A manner in which the server obtains the to-be-recognized image includes, but is not limited to: receiving an image sent by a terminal by using an information retrieval application, and using the received image as the to-be-recognized image.

103. The server performs recognition on the to-be-recognized image according to the trained SHNN model, to obtain a class probability vector of the to-be-recognized image.

A class probability of each class is actually the average value of the elements on each dimension of the at least two reference class probability vectors. Therefore, according to the method provided in this embodiment of the present disclosure, a class probability vectors same as at least two HNN models may be obtained according to one model, thereby shortening time consumed in the recognition process while ensuring recognition accuracy.

Based on the SHNN model trained in advance, after obtaining the to-be-recognized image, the server inputs the to-be-recognized image to the trained SHNN model, extracts the feature vector from the to-be-recognized image according to the trained SHNN model, and processes the extracted feature vector, to obtain the class probability vector of the to-be-recognized image. The class probability vector includes the class probability that the to-be-recognized image belongs to each class.

When the trained SHNN model is a model that can recognize different sites within a specific position range, recognition is performed on the to-be-recognized image according to the trained SHNN model, and an obtained class probability vector includes class probabilities that the to-be-recognized image belongs to different sites. In this case, if the to-be-recognized image has an FOV label, and the FOV label includes a photographing position, a photographing orientation, a visual angle, a largest visual distance, and the like, the server may perform recognition on the to-be-recognized image according to the FOV label, and updates the class probability vector of the to-be-recognized image according to a recognition result. Refer to steps 1031 to 1033 for a specific process.

1031. The server determines at least target landmark according to the FOV label.

For a specific implementation of the process, refer to the following steps 10311 to 10312.

10311. The server determines a plurality of candidate landmarks according to the photographing position in the FOV label.

The server may select a plurality of candidate landmarks within a specific position range centered on the photographing position. The specific position range is determined by a processing capability of the server, and the candidate landmarks are scenic spots to which photographed content in the to-be-recognized image may belong.

10312. The server selects the at least one target landmark from the at least two candidate landmarks according to the photographing orientation, the visual angle, and the largest visual distance.

In this embodiment of the present disclosure, the at least one target landmark is the same as classes included in the class probability vector. For example, the at least one target landmark is the Forbidden City, the Beihai Park, and the Jingshan Park, and the classes included in the class probability vector should also be the Forbidden City, the Beihai Park, and the Jingshan Park.

1032. The server calculates a capture probability of each target landmark.

When calculating the capture probability of each target landmark, the server may perform integral calculation on a Gaussian curve of each target landmark, and uses an obtained integral value as the capture probability of each target landmark.

1033. The server updates the class probability vector of the to-be-recognized image according to the capture probability of the at least one target landmark.

The server calculates a probability average value of a capture probability and a class probability that correspond to a same class and that are in the at least one target landmark and the class probability vector; and updates the class probability vector of the to-be-recognized image according to the probability average value of each class.

For example, the classes corresponding to the class probability vector of the to-be-recognized image are the Forbidden City, the Beihai Park, and the Jingshan Park, and class probabilities of the Forbidden City, the Beihai Park, and the Jingshan Park are respectively 0.85, 0.15, and 0. The at least one target landmark is the Forbidden City and the Beihai Park, and capture probabilities of the Forbidden City and the Beihai Park are 0.95 and 0.05. Then a probability average value of the Forbidden City is (0.85+0.95)/2=0.9, a probability average value of the Beihai Park is (0.15+0.05)/2=0.1, and a probability average value of the Jingshan Park is (0+0)/2=0. It is found, according to the probability average value of each class, that an updated class probability vector of the to-be-recognized image is (0.9, 0.1, 0).

The server updates the class probability vector of the to-be-recognized image according to the capture probability of each target landmark, further improving accuracy of the recognition result.

104. The server determines a class of the to-be-recognized image according to the class probability vector.

In this embodiment of the present disclosure, if the to-be-recognized image has no FOV label, the server may directly use a largest value in the class probability vector of the to-be-recognized image as the class of the to-be-recognized image. For example, the class probabilities that the to-be-recognized image is the Forbidden City, the Beihai Park, and the Jingshan Park are determined, according to the class probability vector, to be respectively 0.85, 0.15, and 0, and then it may be determined that the class of the to-be-recognized image is the Forbidden City. If the to-be-recognized image has the FOV label, the server may use a largest value in the updated class probability vector of the to-be-recognized image as the class of the to-be-recognized image. For example, the class probabilities that the to-be-recognized image is the Forbidden City, the Beihai Park, and the Jingshan Park are determined, according to the updated class probability vector, to be respectively 0.9, 0.1, and 0, and then it may be determined that the class of the to-be-recognized image is the Forbidden City.

105. The server retrieves a similar image of the to-be-recognized image according to the trained SHNN model.

In the process of performing recognition on the to-be-recognized image by using the trained SHNN model, the server may further retrieve the similar image of the to-be-recognized image according to the feature vector of the to-be-recognized image. A specific retrieval process is as follows:

The server extracts the feature vector of the to-be-recognized image according to the trained SHNN model, and maps the extracted feature vector to a binary hash code of the to-be-recognized image, so as to calculate a hamming distance between a binary hash code of each image stored in an image database and the binary hash code of the to-be-recognized image, and determine, if the hamming distance between the binary hash code of any image and the binary hash code of the to-be-recognized image is less than a first preset value, that the image is the similar image of the to-be-recognized image.

The hamming distance is a quantity of different characters at a same position of two binary hash codes. For example, for two binary hash codes 10101 and 00110, the two binary hash codes have different characters at a first digit, a fourth digit, and a fifth digit, and therefore, the hamming distance between the two binary hash codes is 3. The first preset value may be determined according to digits of the binary hash code. For example, there are 10 digits of the binary hash code, and the first preset value may be 1, 2, 3, or 4.

A process in which the server maps the extracted feature vector to the binary hash code is: The server converts an element on each dimension in the feature vector to an S-type value, to obtain at least two S-type values, a quantity of the at least two S-type values being the same as a quantity of dimensions of the feature vector; for the at least two S-type values, if any S-type value is greater than the second preset value, maps the S-type value to 1; if the S-type value is less than the second preset value, maps the S-type value to 0; and then forms, according to an element sequence of each dimension in the feature vector, a character string by using 0 or 1 to which the at least two S-type values are mapped, to obtain the binary hash code.

Generally, in a related technology, when the similar image is retrieved, a similarity of the extracted feature vector needs to be calculated, however, a dimension of the extracted feature vector is relatively high and is usually 4096-dimension, resulting in a large calculation amount during similarity calculation, long retrieval time, and lower retrieval efficiency. In this embodiment of the present disclosure, the binary hash code used when the similar image is retrieved is formed by 0 s or 1 s. The similar image may be obtained without a need to perform similarity calculation by using a complex algorithm, thereby shortening retrieval time and improving retrieval efficiency.

Figure 3:
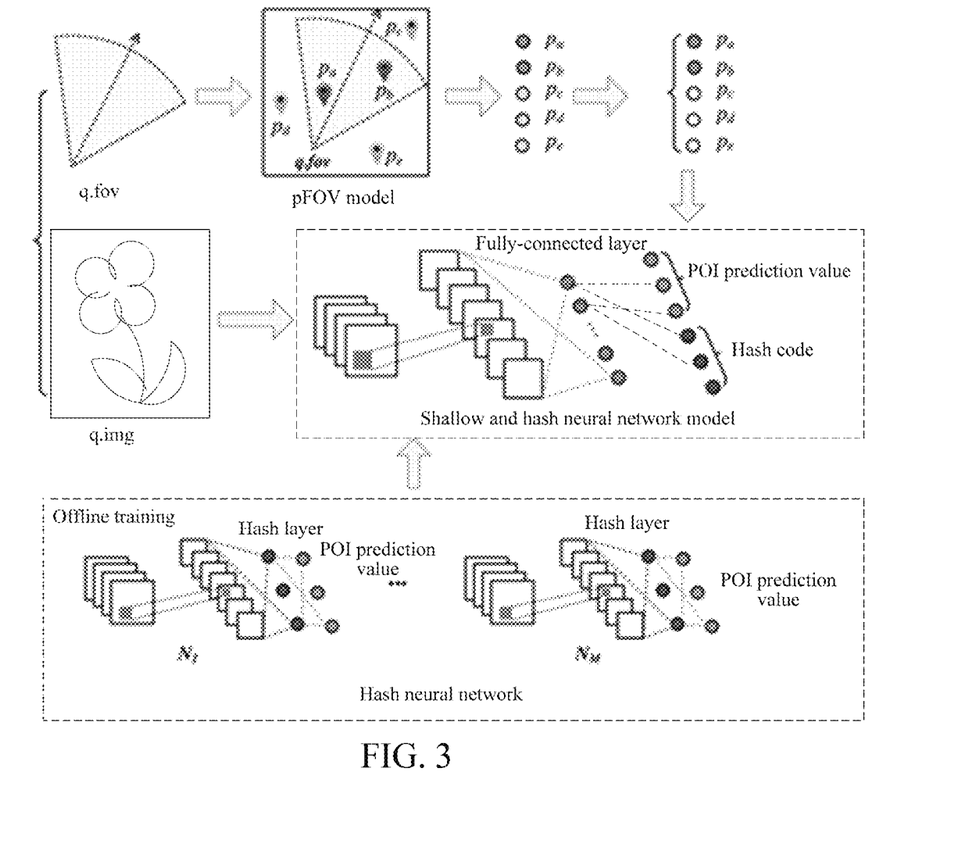
FIG. 3 is a schematic diagram of an image recognition process according to an embodiment of the present disclosure.

FIG. 3 is a schematic diagram of an image recognition process. Referring to FIG. 3, at least two training HNN models $N_1, \ldots, N_M$ are trained offline according to at least two training images, to obtain at least two trained HNN models; at least two modeling images are input to the at least two trained HNN models, to obtain at least two reference class probability vectors and at least two binary hash codes; a class probability vector corresponding to each modeling image is calculated according to the at least two reference class probability vectors corresponding to each modeling image; and an average binary hash code corresponding to each modeling image is calculated according to the at least two binary hash codes corresponding to each modeling image, so as to train any to-be-trained HNN model based on the class probability vector and the average binary hash code corresponding to the modeling image, to obtain a trained SHNN model.

For a to-be-recognized image q.img, the to-be-recognized image q.img is input to the trained SHNN model, and recognition is performed on the to-be-recognized image q.img according to the trained SHNN model, to obtain a class probability vector. The to-be-recognized image q.img has an FOV label, and therefore a server further determines candidate landmarks $P_a$, $P_b$, $P_c$, $P_d$, and $P_e$ according to a photographing position in the FOV label, selects target landmarks $P_a$ and $P_b$ from the determined candidate landmarks according to a photographing orientation, a visual angle, and a largest visual distance in the FOV label, calculates capture probabilities of the target landmarks $P_a$ and $P_b$, and updates the class probability vector according to the capture probabilities of the target landmarks $P_a$ and $P_b$, so as to determine a class of the to-be-recognized image q.img according to an updated class probability vector.

It should be noted that the method provided in this embodiment of the present disclosure is not only applicable to performing recognition on an image, but also applicable to performing recognition on video data. When a to-be-recognized target object is the video data, the video data may be clipped into a plurality of frames of images in a frame capture manner, and then recognition is performed on each frame of image.

According to the method provided in this embodiment of the present disclosure, recognition is performed on the to-be-recognized image by using the trained SHNN model, and the trained SHNN model are obtained by aggregating at least two trained HNN models, thereby not only ensuring recognition accuracy, but also greatly shortening time consumed in the recognition process. In addition, when the similar image is retrieved, complex calculation is not needed, but the hamming distance between different images needs to be calculated, thereby greatly reducing calculation complexity, shortening the retrieval time and improving the retrieval efficiency.

Figure 4:
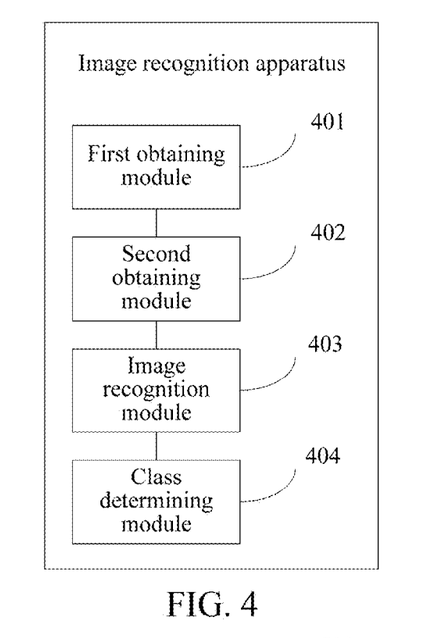
FIG. 4 is a schematic structural diagram of an image recognition apparatus according to an embodiment of the present disclosure.

Referring to FIG. 4, an embodiment of the present disclosure provides an image recognition apparatus. The apparatus is disposed in a server, and the apparatus includes:

a first obtaining module 401, configured to obtain a to-be-recognized image;

a second obtaining module 402, configured to obtain a trained SHNN model, the trained SHNN model being obtained by aggregating at least two trained HNN models;

an image recognition module 403, configured to perform recognition on the to-be-recognized image according to the trained SHNN model, to obtain a class probability vector of the to-be-recognized image, the class probability vector including a class probability that the to-be-recognized image belongs to each class, the class probability of each class being an average value of elements on each dimension of at least two reference class probability vectors, and the at least two reference class probability vectors being obtained by performing recognition on the to-be-recognized image by using the at least two FINN models; and a class determining module 404, configured to determine a class of the to-be-recognized image according to the class probability vector.

In another embodiment of the present disclosure, the apparatus further includes:

a third obtaining module, configured to obtain at least two training images, each training image being marked with an initial class;

a model training module, configured to train at least two to-be-trained HNN models according to the at least two training images, to obtain the at least two trained FINN models; and a model aggregation module, configured to aggregate the at least two trained HNN models, to obtain the trained SHNN model.

In another embodiment of the present disclosure, the model aggregation module is configured to: obtain at least two modeling images; for any modeling image, performing recognition on the modeling image according to each trained FINN model, to obtain at least two reference class probability vectors of the modeling image; calculate an average value of elements on a same dimension of the at least two reference class probability vectors of the modeling image, to obtain a class probability vector of the modeling image; determine an initial class of the modeling image according to the class probability vector of the modeling image; and train any to-be-trained HNN model according to at least two modeling images to which initial classes are added, to obtain the trained SHNN model.

In another embodiment of the present disclosure, the apparatus further includes:

a feature extraction module, configured to extract a feature vector of the to-be-recognized image according to the trained SHNN model, and map the extracted feature vector as a binary hash code of the to-be-recognized image;

a first calculation module, configured to calculate a hamming distance between a binary hash code of each image stored in an image database and the binary hash code of the to-be-recognized image; and a similar image determining module, configured to determine, if the hamming distance between the binary hash code of any image and the binary hash code of the to-be-recognized image is less than a first preset value, that the image is a similar image of the to-be-recognized image, the binary hash code being a character string of 0 s or 1 s.

In another embodiment of the present disclosure, the feature extraction module is configured to: convert an element on each dimension in the feature vector to an S-type value, to obtain at least two S-type values, a quantity of the at least two S-type values being the same as a quantity of dimensions of the feature vector; if any S-type value is greater than a second preset value, map the S-type value to 1; if the S-type value is less than the second preset value, map the S-type value to 0; and form, according to an element sequence of each dimension in the feature vector, a character string by using 0 or 1 to which the at least two S-type values are mapped, to obtain the binary hash code of the to-be-recognized image.

In another embodiment of the present disclosure, the apparatus further includes:

a landmark determining module, configured to: if the to-be-recognized image has an FOV label, determine at least one target landmark according to the FOV label;

a second calculation module, configured to calculate a capture probability of each target landmark; and an updating module, configured to: update the class probability vector of the to-be-recognized image according to the capture probability of the at least one target landmark.

In another embodiment of the present disclosure, the FOV label includes a photographing position, a photographing orientation, a visual angle, and a largest visual distance; and the landmark determining module is configured to: determine at least two candidate landmarks according to the photographing position; and select the at least one target landmark from the at least two candidate landmarks according to the photographing orientation, the visual angle, and the largest visual distance.

In another embodiment of the present disclosure, the updating module is configured to: calculate a probability average value of a capture probability and a class probability that correspond to a same class and that are in the at least one target landmark and the class probability vector; and update the class probability vector of the to-be-recognized image according to the probability average value of each class.

In conclusion, according to the storage medium provided in this embodiment of the present disclosure, recognition is performed on the to-be-recognized image by using the trained SHNN model, and the trained SHNN model are obtained by aggregating at least two trained HNN models, thereby not only ensuring recognition accuracy, but also greatly shortening time consumed in the recognition process.

Figure 5:
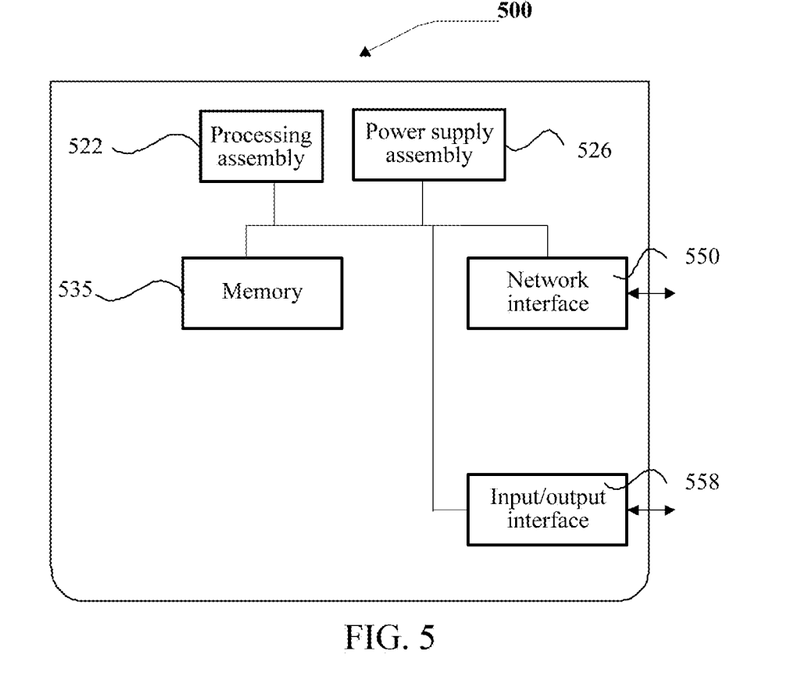
FIG. 5 shows a server for image recognition according to an exemplary embodiment.

FIG. 5 shows a server for image recognition according to an exemplary embodiment. Referring to FIG. 5, the server 500 includes a processing assembly 522, and the processing assembly 522 further includes one or more processors, and a memory resource represented by a memory 532. The memory resource is used for storing at least one instruction, at least one program, a code set, or an instruction set that can be executed by the processing assembly 522. The at least one instruction, the at least one program, the code set, or the instruction set are loaded by the processing assembly 522 to perform functions performed by the server in the image recognition method in FIG. 1.

The server 500 may further include a power supply assembly 526, configured to perform power supply management of the server 500, a wired or wireless network interface 550, configured to connect the server 500 to a network, and an input/output (I/O) interface 558. The server 500 may operate an operating system that is stored in the memory 532, for example, Windows Server™, Mac OS X™, Unix™, Linux™, or FreeBSD™.

According to the server provided in this embodiment of the present disclosure, recognition is performed on the to-be-recognized image by using the trained SHNN model, and the trained SHNN model are obtained by aggregating at least two trained HNN models, thereby not only ensuring recognition accuracy, but also greatly shortening time consumed in the recognition process.

The embodiments of the present disclosure further provide a storage medium. The storage medium stores at least one instruction, at least one program, a code set, or an instruction set, and the at least one instruction, the at least one program, the code set, or the instruction set is loaded and executed by a processor to perform the image recognition method shown in FIG. 1.

According to the storage medium provided in this embodiment of the present disclosure, recognition is performed on the to-be-recognized image by using the trained SHNN model, and the trained SHNN model are obtained by aggregating at least two trained HNN models, thereby not only ensuring recognition accuracy, but also greatly shortening time consumed in the recognition process.

It should be noted that, when the image recognition apparatus or the server for image recognition provided in the foregoing embodiments performs image recognition, only divisions of the foregoing functional modules are described by using an example. In an actual application, the foregoing functions may be allocated to and completed by different functional modules according to requirements, that is, the internal structure of the image recognition apparatus or the server for image recognition is divided into different functional modules, to complete all or some of the foregoing described functions. In addition, the image recognition apparatus or the server for image recognition provided in the foregoing embodiments belongs to the same concept as the embodiments of the image recognition method. For a specific implementation process of the image recognition apparatus or the server for image recognition, refer to the method embodiments, and details are not described herein again.

A person of ordinary skill in the art may understand that all or some of the steps of the embodiments may be implemented by hardware or a program instructing related hardware. The program may be stored in a computer readable storage medium. The storage medium may be a read-only memory, a magnetic disk, or an optical disc.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for image recognition, comprising:
   receiving, by interface circuitry of a server device, an image to be recognized;
   obtaining, by processing circuitry of the server device, a shallow hash neural network (SHNN) model that has been trained from a hash neural network (FINN) model and based on a set of SHNN training images that aggregates image recognition results from at least two reference hash neural network (HNN) models;
   performing, by the processing circuitry, an image recognition on the image according to the SHNN model, to obtain an image class vector in an image class space, the image class vector including probability values of respective image classes in the image class space, a probability value of an image class in the image class space being a combination of intermediate probability values of the image class that are resulted from the at least two reference HNN models due to the SHNN model being trained based on the aggregation of image recognition results from the at least two reference HNN models; and
   determining, by the processing circuitry, one of the image classes for the image according to the probability values of the respective image classes in the image class space.

2. The method according to claim 1, further comprising:
   obtaining at least two training images that are respectively marked with an initial image class;
   training at least two HNN models according to the at least two training images, to obtain the at least two reference HNN models; and
   aggregating the at least two reference FINN models, to obtain the SHNN model.

3. The method according to claim 2, further comprising:
   obtaining at least two modeling images;
   for each modeling image of the at least two modeling images, performing recognition on the modeling image respectively according to the at least two reference FINN models, to obtain at least two intermediate image class vectors of the modeling image;
   calculating average probability values by the image classes from the at least two intermediate image class vectors;
   determining an aggregation image class of the modeling image according to the average probability values by the image classes of the modeling image to convert the modeling image to an SHNN training image with the aggregation image class; and
   training the HNN model according to the at least two SHNN training images, to obtain the SHNN model.

4. The method according to claim 1, further comprising:
   extracting a feature vector of the image according to the SHNN model;
   mapping the extracted feature vector to a binary hash code for the image, the binary hash code having a string of binary values;
   calculating a hamming distance between the binary hash code of the image, and a reference binary hash code of a reference image that is stored in an image database; and
   determining, when the hamming distance between the binary hash code of the image and the reference binary hash code of the reference image is less than a first preset value, that the image is a similar image to the reference image.

5. The method according to claim 4, further comprising:
   converting respective elements on dimensions in the feature vector to respective S-type values;
   respectively converting the S-type values to binary values corresponding to the elements based on a second preset value; and
   forming, a character string using the binary values according to a sequence of the corresponding elements in the feature vector.

6. The method according to claim 1, further comprising:
   when the image has a field of view (FOV) label, determining a target landmark according to the FOV label;
   calculating a capture probability of the target landmark; and
   updating the image class vector of the image according to the capture probability of the target landmark.

7. The method according to claim 6, wherein the FOV label comprises a photographing position, a photographing orientation, a visual angle, and a largest visual distance, and the method further comprises:
   determining at least two candidate landmarks according to the photographing position; and
   selecting the target landmark from the at least two candidate landmarks according to the photographing orientation, the visual angle, and the largest visual distance.

8. The method according to claim 6, further comprising:
   calculating an average value of the capture probability for the target landmark and a probability value for an image class that corresponds to the target landmark; and
   updating the image class vector of the image according to the average value.

9. A server device for image recognition, comprising:
   interface circuitry configured to receive an image to be recognized; and
   processing circuitry configured to:
   obtain a shallow hash neural network (SHNN) model that has been trained from a hash neural network (HNN) model and based on a set of SHNN training images that aggregates image recognition results from at least two reference hash neural network (HNN) models;

perform an image recognition on the image according to the SHNN model, to obtain an image class vector in an image class space, the image class vector including probability values of respective image classes in the image class space, a probability value of an image class in the image class space being a combination of intermediate probability values of the image class that are resulted from the at least two reference HNN models due to the SHNN model being trained based on the aggregation of image recognition results from the at least two reference HNN models; and determine one of the image classes for the image according to the probability values of the respective image classes in the image class space.

10. The server device according to claim 9, wherein the processing circuitry is further configured to:

obtain at least two training images that are respectively marked with an initial image class;

train at least two HNN models according to the at least two training images, to obtain the at least two reference HNN models; and aggregate the at least two reference HNN models, to obtain the SHNN model.

11. The server device according to claim 10, wherein the processing circuitry is configured to obtain at least two modeling images;

for each modeling image of the at least two modeling images, perform recognition on the modeling image respectively according to the at least two reference HNN models, to obtain at least two intermediate image class vectors of the modeling image;

calculate average probability values by the image classes from the at least two intermediate image class vectors;

determine an aggregation image class of the modeling image according to the average probability values by the image classes of the modeling image to convert the modeling image to an SHNN training image with the aggregation image class; and train the HNN model according to the at least two SHNN training images, to obtain the SHNN model.

12. The server device according to claim 9, wherein the processing circuitry is configured to:

extract a feature vector of the image according to the SHNN model;

map the extracted feature vector to a binary hash code for the image, the binary hash code having a string of binary values;

calculate a hamming distance between the binary hash code of the image, and a reference binary hash code of a reference image that is stored in an image database; and determine, when the hamming distance between the binary hash code of the image and the reference binary hash code of the reference image is less than a first preset value, that the image is a similar image to the reference image.

13. The server device according to claim 12, wherein the processing circuitry is configured to:

convert respective elements on dimensions in the feature vector to respective S-type values;

respectively convert the S-type values to binary values corresponding to the elements based on a second preset value; and form, a character string using the binary values according to a sequence of the corresponding elements in the feature vector.

14. The server device according to claim 9, wherein the processing circuitry is configured to:

when the image has a field of view (FOV) label, determine a target landmark according to the FOV label;

calculate a capture probability of the target landmark; and update the image class vector of the image according to the capture probability of the target landmark.

15. The server device according to claim 14, wherein the FOV label comprises a photographing position, a photographing orientation, a visual angle, and a largest visual distance, and the processing circuitry is further configured to:

determine at least two candidate landmarks according to the photographing position; and select the target landmark from the at least two candidate landmarks according to the photographing orientation, the visual angle, and the largest visual distance.

16. The server device according to claim 15, wherein the processing circuitry is configured to:

calculate an average value of the capture probability for the target landmark and a probability value for an image class that corresponds to the target landmark; and update the image class vector of the image according to the average value.

17. A non-transitory computer-readable medium storing instructions which when executed by a computer cause the computer to perform:

receiving an image to be recognized;

obtaining a shallow hash neural network (SHNN) model that has been trained from a hash neural network (HNN) model and based on a set of SHNN training images that aggregates image recognition results from at least two reference hash neural network (HNN) models;

performing an image recognition on the image according to the SHNN model, to obtain an image class vector in an image class space, the image class vector including probability values of respective image classes in the image class space, a probability value of an image class in the image class space being a combination of intermediate probability values of the image class that are resulted from the at least two reference HNN models due to the SHNN model being trained based on the aggregation of image recognition results from the at least two reference HNN models; and determining one of the image classes for the image according to the probability values of the respective image classes in the image class space.

18. The non-transitory computer-readable medium according to claim 17, wherein the instructions cause the computer to further perform:

obtaining at least two training images that are respectively marked with an initial image class;

training at least two HNN models according to the at least two training images, to obtain the at least two reference HNN models; and aggregating the at least two reference HNN models, to obtain the SHNN model.

19. The non-transitory computer-readable medium according to claim 18, wherein the instructions cause the computer to further perform:

obtaining at least two modeling images;

for each modeling image of the at least two modeling images, performing recognition on the modeling image respectively according to the at least two reference HNN models, to obtain at least two intermediate image class vectors of the modeling image;

calculating average probability values by the image classes from the at least two intermediate image class vectors;

determining an aggregation image class of the modeling image according to the average probability values by the image classes of the modeling image to convert the modeling image to an SHNN training image with the aggregation image class; and training the HNN model according to the at least two SHNN training images, to obtain the SHNN model.

20. The non-transitory computer-readable medium according to claim 17, wherein the instructions cause the computer to further perform:

extracting a feature vector of the image according to the SHNN model;

mapping the extracted feature vector to a binary hash code for the image, the binary hash code having a string of binary values;

calculating a hamming distance between the binary hash code of the image, and a reference binary hash code of a reference image that is stored in an image database; and determining, when the hamming distance between the binary hash code of the image and the reference binary hash code of the reference image is less than a first preset value, that the image is a similar image to the reference image.

\* \* \* \* \*